United States Patent [19]

Carroll et al.

[11] 4,438,252

[45] Mar. 20, 1984

[54] POLYMER-MODIFIED POLYOLS

[75] Inventors: William G. Carroll, Lancashire; Peter Farley, Manchester; Raymond J. Marklow, Cheshire, all of England

[73] Assignee: Imperial Chemical Industries Limited, London, England

[21] Appl. No.: 398,885

[22] Filed: Jul. 16, 1982

[30] Foreign Application Priority Data

Aug. 8, 1981 [GB] United Kingdom ............... 8124506
Mar. 29, 1982 [GB] United Kingdom ............... 8209218

[51] Int. Cl.³ .................... C08G 18/38; C08G 18/48; C08G 18/52
[52] U.S. Cl. ...................................... 528/75; 528/77; 528/85; 528/78; 521/137; 521/163; 252/182
[58] Field of Search .................... 528/75, 77, 85, 78; 521/137, 163; 252/182

[56] References Cited

U.S. PATENT DOCUMENTS

| | | | |
|---|---|---|---|
| 3,383,351 | 2/1974 | Stamberger | 524/762 |
| 4,332,716 | 6/1982 | Shah | 521/137 |

FOREIGN PATENT DOCUMENTS

| | | |
|---|---|---|
| 32380 | 1/1981 | European Pat. Off. |
| 35687 | 2/1981 | European Pat. Off. |
| 1044267 | 9/1966 | United Kingdom. |
| 1053131 | 12/1966 | United Kingdom. |
| 1453258 | 10/1976 | United Kingdom. |
| 1482213 | 8/1977 | United Kingdom. |
| 1501172 | 2/1978 | United Kingdom. |
| 1571184 | 7/1980 | United Kingdom. |
| 1598967 | 9/1981 | United Kingdom. |

OTHER PUBLICATIONS

Journ. of Cellular Plastics 17, 1, Jan./Feb. 1981, pp. 43–49.

*Primary Examiner*—John Kight, III
*Assistant Examiner*—M. L. Moore
*Attorney, Agent, or Firm*—Cushman, Darby & Cushman

[57] ABSTRACT

A polymer-modified polyol comprises a dispersion in a first polyol which has a molecular weight of at least 1000, an average functionality of more than 2, and a Hydroxyl Number of less than 150, of the reaction product of a polyisocyanate and a second polyol which is either (a) a polyethylene glycol having a molecular weight of up to 600 or (b) a polyol, which is not a polyethylene glycol, and which has a molecular weight of less than 250 and is free from nitrogen atoms.

A method of forming the polymer-modified polyol, its use in the manufacture of polyurethane products and the polyurethane products so obtained, are included.

The dispersions are particularly useful for preparing highly resilient flexible foams.

9 Claims, No Drawings

POLYMER-MODIFIED POLYOLS

This specification describes an invention which relates to polymer-modified polyols useful in polyurethane manufacture.

Stable dispersions of a polyurethane in a high molecular weight dihydric alcohol having substantially exclusively secondary hydroxyl groups are known from UK Patent Specification No. 1053131. These dispersions are polymer-modified polyols and are prepared by reacting an organic diisocyanate and a glycol in the high molceular weight dihydric alcohol. They are designed for use as thickener pastes and, being compatible with textiles and dyestuffs, are especially valuable as auxiliary agents therefor.

European Patent Specification No. 0032380 describes the use of storage stable suspensions of a hard crystalline organic component in a soft polyol which has a functionality of 2 to 8 and a Hydroxyl Number of 150 to 700. The crystalline component may be a polyurethane obtained by reacting an organic diisocyanate with an aliphatic diol. The suspensions are used to make rigid foams.

According to one aspect of the present invention there is provided a polymer-modified polyol comprising a dispersion in a first polyol which has a molecular weight of at least 1000, an average functionality (i.e. an average number of isocyanate-reactive hydroxyl groups in each molecule) of more than 2, preferably about 3, and a Hydroxyl Number of less than 150, of the reaction product of a polyisocyanate and a second polyol which is either (a) a polyethylene glycol having a molecular weight of up to 600 or (b) a polyol, which is not a polyethylene glycol, and which has a molecular weight of less than 250 and is free from nitrogen atoms.

Other aspects of the invention include a method of forming the polymer-modified polyol, its use in the manufacture of polyurethane products, especially flexible polyurethane foam, and the polyurethane products so obtained.

By the term "polymer-modified polyol" is meant a polyol containing additional polymeric material. The term is understood by those skilled in the art and is used, for example, in British Pat. No. 1,453,258 to describe dispersions of polyureas and polyhydrazo-dicarbonamides in polyethers obtained by reacting polyisocyanates with primary and secondary amines, hydrazines or hydrazides in polyethers.

The first polyol used in the invention may be any of the polyols, or mixtures thereof, used in the manufacture of polyurethanes providing it has a molecular weight of at least 1000, an average functionality of more than 2 and a Hydroxyl Number of less than 150. These polyols are of a type used in the manufacture of flexible foams and are well known to polyurethane technologists and documented in the relevant literature. Normally the polyol will be a polyether polyol, although it may easily be another type of polyol such as a polyester polyol. Of particular interest are polyether polyols having a molecular weight of from 1000 to 10,000, preferably 1000–8000, and especially polyether triols having a molecular weight of 2000–6000. Suitably they are polyoxyalkylene polyols obtained by reacting an alkylene oxide or mixture of alkylene oxides with an active hydrogen-containing initiator. Ethylene oxide-tipped polyoxypropylene polyols are especially useful for the manufacture of high resilience flexible polyurethane foams. Other poly(oxypropylene-oxyethylene)polyols in the form of random or block copolymers are also useful.

Any suitable organic polyisocyanate, i.e. an organic isocyanate having two or more isocyanate groups, may be used in the invention including aliphatic, cycloaliphatic, araliphatic, aromatic and heterocyclic polyisocyanates. Such isocyanates were well known to polyurethane technologists and are documented in the relevant literature (see, for example, British Pat. No. 1,453,258). Of particular interest are the aromatic polysiocyanates, for example tolylene diisocyanate (TDI) and diphenylmethane diisocyanate (MDI) which are commercially available in substantially pure and crude forms. More particularly these include 2,4 and 2,6-tolylene diisocyanates and mixtures thereof; diphenylmethane-2,4'- and -4,4'-diisocyanates and mixtues thereof (generally referred to as pure MDI), for example, a mixture containing from 70 to 100%, especially 80% by weight, of the 4,4'-isomer and from 0 to 30%, especially 20% by weight, of the 2,4'-isomer; mixtures of MDI with polyphenyl polymethane polyisocyanates made by phosgenating a mixture of polyamines which is obtained by condensing aniline with formaldehyde (generally referred to as crude or polymeric MDI); and mixtures of TDI and MDI, pure or crude, for example, a mixture containing 60% by weight of TDI and 40% by weight of MDI. There may also be used diisocyanates which have been modified in known manner to introduce a significant isocyanurate, carbodiimide, uretonimine, buiret or allophanate content. Other polyisocyanates which may be used include isocyanate-ended prepolymers, for example, reaction products of a diisocyanate with a deficiency of one or more low molecular weight polyols such as trimethylolpropane, dipropylene glycol or tripropylene glycol.

The second polyol used in the invention may be a polyethylene glycol having a molecular weight of up to 600, including diethylene or triethylene glycol. Preferably, however, it has a molecular weight of from 200 to 600 and especially from 200 to 300.

Alternatively, the second polyol may be a polyol, which is not a polyethylene glycol, and which has a molecular weight of less than 250 and is free from nitrogen atoms. It may be selected from various nitrogen free compounds having two or more hydroxyl groups. Preferably it has two primary hydroxy groups but any further hydroxyl groups present may be primary or secondary. Suitable compounds from which it may be selected include diols such as mono-alkylene glycols, e.g. ethylene, 1,2- and especially 1,3-propylene, 1,4-butylene and 1,6-hexylene glycols and triols such as glycerol and trimethylol propane.

According to another aspect of the invention there is provided a method of forming a polymer-modified polyol in which a polyisocyanate is reacted in the presence of a first polyol which has a molecular weight of at least 1000, an average functionality of more than 2 and a Hydroxyl Number of less than 150, with a second polyol which is either (a) a polyethylene glycol having a molecular weight of up to 600 or (b) a polyol, which is not a polyethylene glycol, and which has a molecular weight of less than 250 and is free from nitrogen atoms.

In carrying out the method of the invention, the polyisocyanate and second polyol are mixed together in a molar ratio of about 0.5:1.0 to 1.5:1, preferably 0.8:1.0 to 1.1:1.0 and especially 1.0:1.0, in the presence of the first polyol. The molecular weight and viscosity of the poly-addition product so formed may be varied by adjusting the ratio of polyisocyanate and second polyol. Molar ratios greater than 1.0:1.0 are more usually considered useful with a second polyol which has three or more hydroxyl groups rather than with diols.

The molecular weight of the poly-addition product may be varied by introducing monofunctionally reactive compounds to act as chain terminators. Such compounds include monofunctional isocyanates, and monohydric alcohols. They may usefully be used in amounts of up to 25 mol % of the second polyol.

The reaction may be catalysed by a catalyst of the type and in an amount conventionally used for the formation of polyurethanes, for example, an organometallic compound such as stannous octoate and dibutyl tin dilaurate or an amine such as triethylene diamine.

The concentration of the poly-addition product in the polymer-modified polyol may vary within wide limits but for most purposes it will be between 1 and 80%, usually from 10 to 60% and typically 20% by weight based on the total weight of the polymer-modified polyol. It may prove advantageous to prepare the polymer-modified polyol at high strength, say at 50 to 60%, and dilute it with more of the first polyol to 10 to 20% before use. The reaction is exothermic and, generally, the higher the concentration of the poly-addition product to be formed, the greater is the exotherm.

It will be recognised that in some polymer-modified polyols of the invention the poly-addition product may not be formed exclusively from the second polyol but may incorporate units derived from the first polyol. It is believed however that in most instances such units never form more than a minor proportion of the total units in the poly-addition product and components are usually selected to achieve this situation e.g. the relative reactivity of the hydroxyls on the two polyols will be selected accordingly.

The polymer-modified polyol of the invention may be formed by a batch process in which either the second polyol or the polyisocyanate is dissolved or dispersed in the first polyol followed by the addition, with agitation, of the other. The dispersion will normally have a finer particle size if the reactants are mixed more efficiently. The viscosity of the product will also tend to be lower. Alternatively, the polymer-modified polyol may be formed by a continuous in-line blending process. In this process the polyisocyanate and two polyols are pumped at controlled rates and may be mixed simultaneously or either the second polyol or the polyisocyanate may be mixed with the first polyol followed by addition and mixing of the other.

Normally it will be sufficient to add the components at room temperature allowing the temperature to rise to up to 150° C. through the exothermic reaction and heat generated by high shear mixing, if used.

The choice of components for the polymer-modified polyol will be governed by the requirement to form a dispersion rather than a solution. As a guide, the more soluble the second polyol is in the isocyanate with which it is to react and the less soluble it is in the first polyol, the better. Preferably the first polyol should have a higher rather than lower molecular weight. It is also desirable to maintain as big a differential as possible in the relative activities towards the polyisocyanate of the first and second polyols.

The polymer-modified polyols of the invention are useful in the manufacture of polyurethane products, especially polyurethane foams.

Polyurethane products are made by reacting a polyisocyanate with a polyol. The polymer-modified polyol of the invention may be used as the polyol component to produce, in particular, flexible polyurethane foam products. The nature of the foam will depend on the particular polyol chosen as the first polyol in which the poly-addition product is dispersed, and also on the polyisocyanate and other ingredients conventionally used in the manufacture of polyurethane foams. They may be selected in known manner to produce the type of foam desired.

Polyisocyanates which may be used in making polyurethane products are comprehensively described in relevant literature and include the organic polyisocyanates described hereinbefore for the preparation of the polymer-modified polyol. The particular polyisocyanate used may be the same or different from that used to prepare the polymer-modified polyol.

The polymer-modified polyols of the invention are of particular value in making highly resilient flexible foams for cushioning and similar applications. These types of foam and their method of manufacture are well known in the polyurethane foam industry. Such foams made from the polymer-modified polyols of the invention have advantages in respect of increased hardness and shrinkage properties. For foams of this type the polymer-modified polyol is usefully prepared from polyoxyalkylene polyols, especially ethylene oxide-tipped polyoxypropylene polyols, and reacted with TDI, pure, crude or modified MDI such as described hereinbefore with respect to the polyisocyanates which may be used to prepare the polymer-modified polyol, or mixtures of TDI or a TDI prepolymer and pure or crude MDI.

The polymer-modified polyols of the invention may be used directly they are made, or stored. If they are made by a continuous in-line blending process an intermediate storage vessel between the blending unit and polyurethane mixing head may be used, if necessary, to allow reaction between the polyisocyanate and second polyol to be completed where this is slow. Polymer-modified polyol dispersions have good storage stability and can be stored before use.

Other conventional ingredients may be used in making the polyurethanes. These include catalysts, for example, tertiary amines and organic tin compounds, surfactants, cross linking or chain lengthening agents, for example, low molecular weight diols, triols and diamines, flame proofing agents, for example, halogenated alkyl phosphates, fillers and pigments. Blowing agents used for forming polyurethane foams include water, which reacts with the polyisocyanate to form carbon dioxide, and inert low boiling liquids such as halogenated hydrocarbons, examples of which are trichlorofluoromethane and dichlorodifluoromethane. Foam stabilisers, for example polysiloxane-polyalkylene oxide block copolymers, may be used to stabilise or regulate the cells of the foam.

The amount of these minor ingredients and blowing agents used will depend on the nature of the product required and may be varied within limits well known to a polyurethane foam technologist. In the case of highly resilient water blown flexible foams, it is appropriate to use from 1.0 to 5.5%, preferably from 1.5 to 4.0%, by weight of water based on the weight of the total polyol component. An inert low boiling liquid may be used as an additional blowing agent, it it is desired to reduce the foam density.

In general, the composition of the foam-forming reaction mixture should be such that the ratio of isocyanate groups to active hydrogen atoms is within the range of 0.7:1 to 1.2:1, preferably 0.8:1 to 1.1:1.

One shot, prepolymer or quasi-prepolymer methods may be employed as may be appropriate for the particular type of polyurethane being made.

The components of the polyurethane forming reaction mixture may be mixed together in any convenient manner, for example by using any of the mixing equipment described in the prior art for the purpose. If desired, some of the individual components may be pre-blended so as to reduce the number of component streams requiring to be brought together in the final mixing step. It is often convenient to have a two-stream system whereby one stream comprises a polyisocyanate or prepolymer and the second stream comprises all the other components of the reaction mixture.

The invention is illustrated by the following Examples in which all parts and percentages are by weight unless otherwise indicated.

EXAMPLES 1-6

90 Parts of an oxypropylated glycerol of molecular weight 3000 is blended with 6.55 parts of tolylene diisocyanate (80:20 2:4/2:6 isomers) and 0.03 parts of dibutyl tin dilaurate. Immediately 3.45 parts of glycerol are added with vigorous agitation.

An opaque dispersion forms. Similar results may be obtained replacing the glycerol with the following polyols and adjusting the amount of tolylene diisocyanate to maintain a molar ratio of 1:1 and a total weight for the two components of 10 parts.

| Example | Polyol |
|---|---|
| 2 | ethylene glycol |
| 3 | diethylene glycol |
| 4 | triethylene glycol |
| 5 | 1,4-butane diol |
| 6 | 1,2-propylene glycol (opacity formed on standing). |

EXAMPLE 7

Essentially similar results to Example 1 are obtained when the molar proportions of glycerol to tolylene diisocyanate are changed to 1.0:1.5 maintaining the same total weight.

EXAMPLE 8

Essentially similar results to Example 5 are obtained when the molar proportions of 1,4-butane diol to tolylene diisocyanate are changed to 1.0:0.66 maintaining the same total weight.

EXAMPLES 9-16

Examples 1-8 are repeated replacing the oxypropylated glycerol of molecular weight 3000 with an equal amount of polypropylene glycol of molecular weight 4000 to give essentially similar results.

By way of comparison and for guidance, replacing the oxypropylated glycerol of Examples 1-8 by a material of molecular weight 6000 having 16% ethylene oxide tipping results in a solution rather than a dispersion.

EXAMPLES 17-19

Oxypropylated glycerol (OPG) of molecular weight 6000 having 16% ethylene oxide tipping is mixed with a polyethylene glycol (PEG) with vigorous agitation. A uretonimine modified pure MDI is added, optionally in the presence of 1,4-diazabicyclo [222] octane (DABCO) catalyst, over approximately five minutes and agitation is continued for another five minutes.

The quantities, in parts, of materials used and the molecular weight of the polyethylene glycol are recorded in Table 1.

TABLE 1

| Material Used | Example No. | | |
|---|---|---|---|
| | 17 | 18 | 19 |
| OPG | 65.0 | 65.0 | 65.0 |
| PEG (MW 200) | 20.3 | — | — |
| PEG (MW 300) | — | 23.6 | — |
| PEG (MW 600) | — | — | 28.2 |
| DABCO | 0.1 | — | — |
| MDI | 14.7 | 11.4 | 6.8 |

In each of these Examples, 1 mole of glycol is present to react with 0.5 moles of MDI. Hence there are sufficient isocyanate groups present to react with 50% hydroxyl groups in the polyethylene glycol. Reaction is carried out at a concentration of 35% by weight of poly-addition product on the total reaction mixture. In each Example, a polymer-modified dispersion is obtained.

By way of comparison, replacement of the PEG (MW 200) in Example 17 by, in turn, PEG (MW 1000) and polypropylene glycol (MW 425) fails to produce a satisfactory dispersion. In the former case, some particles are formed on standing but the product is semi-solid. In the latter case, the product is almost gelled.

EXAMPLES 20-23

Polymer-modified polyols are made using the method of Examples 17-19 using PEG (MW 200) and PEG (MW 300) but at varying concentrations and degrees of reactivity, i.e. different ratios of isocyanate groups present to hydroxyl groups in the PEG. The concentration of the dispersions obtained in the polymer modified polyols are shown in Table 2 together with the degrees of reactivity expressed as a percentage of the number of hydroxyl groups in th PEG actually present to the number theoretically required to react fully with the isocyanate groups present.

High resilience polyurethane foams were prepared from the polymer-modified polyols. The properties of these foams are compared in Table 2.

In each of Examples 22 and 23, the results shown are an average of very similar results (within experimental error) obtained from two foams, one made from a polymer-modified polyol dispersion formed at a concentration of 50% and another made from the same polymer-modified polyol dispersion but diluted to 20% with OPG, during manufacture.

TABLE 2

| | Example No. | | | |
|---|---|---|---|---|
| | 20 | 21 | 22 | 23 |
| MW of PEG used | 200 | 300 | 300 | 300 |
| Concentration of dispersion (%) | 20 | 20 | 50→20 / 50 | 50→20 / 50 |
| Degree of Reactivity (%) | 80 | 80 | 80 | 100 |
| Compression Set (%) | 9 | 7 | 10 | 10 |
| Tensile Strength (kN/m$^2$) | 125 | 105 | 105 | 115 |
| Elongation at Break | 160 | 150 | 145 | 155 |

TABLE 2-continued

| | Example No. | | | |
|---|---|---|---|---|
| | 20 | 21 | 22 | 23 |
| (%) | | | | |
| Tear strength (N/m) | 350 | 340 | 330 | 345 |
| Resilience (%) | 55 | 56 | 58 | 59 |
| Indentation hardness (N/200 mm dia. indentor) | 136 | 116 | 114 | 122 |
| Core density (Kg/M$^3$) | 42 | 44 | 42 | 42 |

We claim:

1. A polymer-modified polyol comprising a dispersion in a first polyol which has a molecular weight of at least 1000, an average functionality of more than 2, and a Hydroxyl Number of less than 150, of the reaction product of a polyisocyanate and a second polyol which is either (a) a polyethylene glycol having a molecular weight of up to 600 or (b) a polyol, which is not a polyethylene glycol, and which has a molecular weight of less than 250 and is free from nitrogen atoms.

2. A polymer-modified polyol according to claim 1 in which the first polyol is a polyoxyalkylene polyol having a molecular weight of from 1000 to 10,000.

3. A method of forming a polymer-modified polyol in which a polyisocyanate is reacted in the presence of a first polyol which has a molecular weight of at least 1000, an average functionality of more than 2 and a Hydroxyl Number of less than 150, with a second polyol which is either (a) a polyethylene glycol having a molecular weight of up to 600 or (b) a polyol, which is not a polyethylene glycol, and which has a molecular weight of less than 250 and is free from nitrogen atoms.

4. A method according to claim 3 in which the polyisocyanate and second polyol are mixed together in a molar ratio of from 0.5:1.0 to 1.5:1.0.

5. A method according to claim 3 in which the concentration of the reaction product of the polyisocyanate and second polyol in the polymer-modified polyol is between 1 and 80% by weight based on the total weight of the polymer-modified polyol.

6. A method of forming a polymer-modified polyol in which a polyisocyanate is reacted in the presence of a first polyol, which is a polyoxyalkylene polyol having a molecular weight of from 1000 to 10,000 with a second polyol which is either (a) a polyethylene glycol having a molecular weight of up to 600 or (b) a polyol, which is not a polyethylene glycol, and which has a molecular weight of less than 250 and is free from nitrogen atoms, the polyisocyanate and second polyol being mixed together in a molar ratio of from 0.5:1.0 to 1.5:1.0 and the concentration of the reaction product of the polyisocyanate and second polyol in the polymer-modified polyol being between 1 and 80% by weight based on the weight of the polymer-modified polyol.

7. In a method of making a polyurethane product in which a polyisocyanate is reacted with a polyol, the improvement which comprises using as the polyol a polymer-modified polyol comprising a dispersion in a first polyol which has a molecular weight of at least 1000, an average functionality of more than 2, and a Hydroxyl Number of less than 150, of the reaction product of a polyisocyanate and a second polyol which is either (a) a polyethylene glycol having a molecular weight of up to 600 or (b) a polyol, which is not a polyethylene glycol, and which has a molecular weight of less than 250 and is free from nitrogen atoms.

8. A method according to claim 7 in which the polyurethane product is a flexible polyurethane foam.

9. Polyurethane products obtained by the method of claim 7.

* * * * *